(12) United States Patent
Kim et al.

(10) Patent No.: US 10,445,778 B2
(45) Date of Patent: Oct. 15, 2019

(54) SHORT DISTANCE USER RECOGNITION SYSTEM, AND METHOD FOR PROVIDING INFORMATION USING SAME

(71) Applicants: Gwon Young Kim, Seoul (KR); Dong Min Shin, Seoul (KR); Dong Suk Chang, Seoul (KR); Chul Hyun Kim, Seoul (KR); Young Bae You, Seoul (KR)

(72) Inventors: Gwon Young Kim, Seoul (KR); Dong Min Shin, Seoul (KR); Dong Suk Chang, Seoul (KR); Chul Hyun Kim, Seoul (KR); Young Bae You, Seoul (KR)

( * ) Notice: Subject to any disclaimer, the term of this patent is extended or adjusted under 35 U.S.C. 154(b) by 464 days.

(21) Appl. No.: 14/779,337

(22) PCT Filed: Mar. 31, 2014

(86) PCT No.: PCT/KR2014/002708
§ 371 (c)(1),
(2) Date: Sep. 23, 2015

(87) PCT Pub. No.: WO2014/163341
PCT Pub. Date: Oct. 9, 2014

(65) Prior Publication Data
US 2016/0063558 A1    Mar. 3, 2016

(30) Foreign Application Priority Data

Apr. 2, 2013   (KR) .................. 10-2013-0036044
Apr. 30, 2013  (KR) .................. 10-2013-0048867
Jun. 3, 2013   (KR) .................. 10-2013-0063566

(51) Int. Cl.
G06Q 30/00   (2012.01)
G06Q 30/02   (2012.01)
(Continued)

(52) U.S. Cl.
CPC ..... *G06Q 30/0261* (2013.01); *G06Q 30/0256* (2013.01); *G06Q 30/0267* (2013.01);
(Continued)

(58) Field of Classification Search
USPC ..... 705/14.49, 14.54, 14.73, 14.58; 455/41.1
See application file for complete search history.

(56) References Cited

U.S. PATENT DOCUMENTS

2012/0022883 A1*  1/2012  Morrison .......... G06Q 30/0617
                                                            705/1.1
2012/0077432 A1*  3/2012  Rose ................... H04B 5/0062
                                                            455/41.1
(Continued)

FOREIGN PATENT DOCUMENTS

KR  10-2012-0020626 A   3/2012
KR  10-2013-0006832 A   1/2013
(Continued)

OTHER PUBLICATIONS

International Search Report for PCT/KR2014/002708 dated Jun. 20, 2014 from Korean Intellectual Property Office.

*Primary Examiner* — Sun M Li
(74) *Attorney, Agent, or Firm* — Revolution IP, PLLC

(57) ABSTRACT

Disclosed are a system for identifying a user at a close range and an information providing system and method using the same, and more particularly to a close-range user identification system and an information providing system and method using the same, in which at least one user located at a close range visible to a client's naked eyes is searched and identified through a network or close-range communication directing, and opened information of the at least one identified user or a location-based advertisement is given to the at least one searched user.

13 Claims, 8 Drawing Sheets

FIG. 1

(51) Int. Cl.
　　　*H04W 76/11*　　　(2018.01)
　　　*H04W 4/80*　　　(2018.01)
　　　*H04W 4/029*　　　(2018.01)
　　　*H04W 8/00*　　　(2009.01)
　　　*G06Q 50/00*　　　(2012.01)
　　　*H04B 5/00*　　　(2006.01)

(52) U.S. Cl.
　　　CPC ........... *G06Q 50/01* (2013.01); *H04B 5/0031* (2013.01); *H04W 4/029* (2018.02); *H04W 4/80* (2018.02); *H04W 8/005* (2013.01); *H04W 76/11* (2018.02)

(56) References Cited

U.S. PATENT DOCUMENTS

| | | | |
|---|---|---|---|
| 2014/0128031 A1* | 5/2014 | Park | H04L 63/18 455/411 |
| 2014/0214986 A1* | 7/2014 | Hwang | H04L 51/046 709/206 |

FOREIGN PATENT DOCUMENTS

| | | |
|---|---|---|
| KR | 10-2013-0025200 A | 3/2013 |
| KR | 10-2013-0030378 A | 3/2013 |

\* cited by examiner

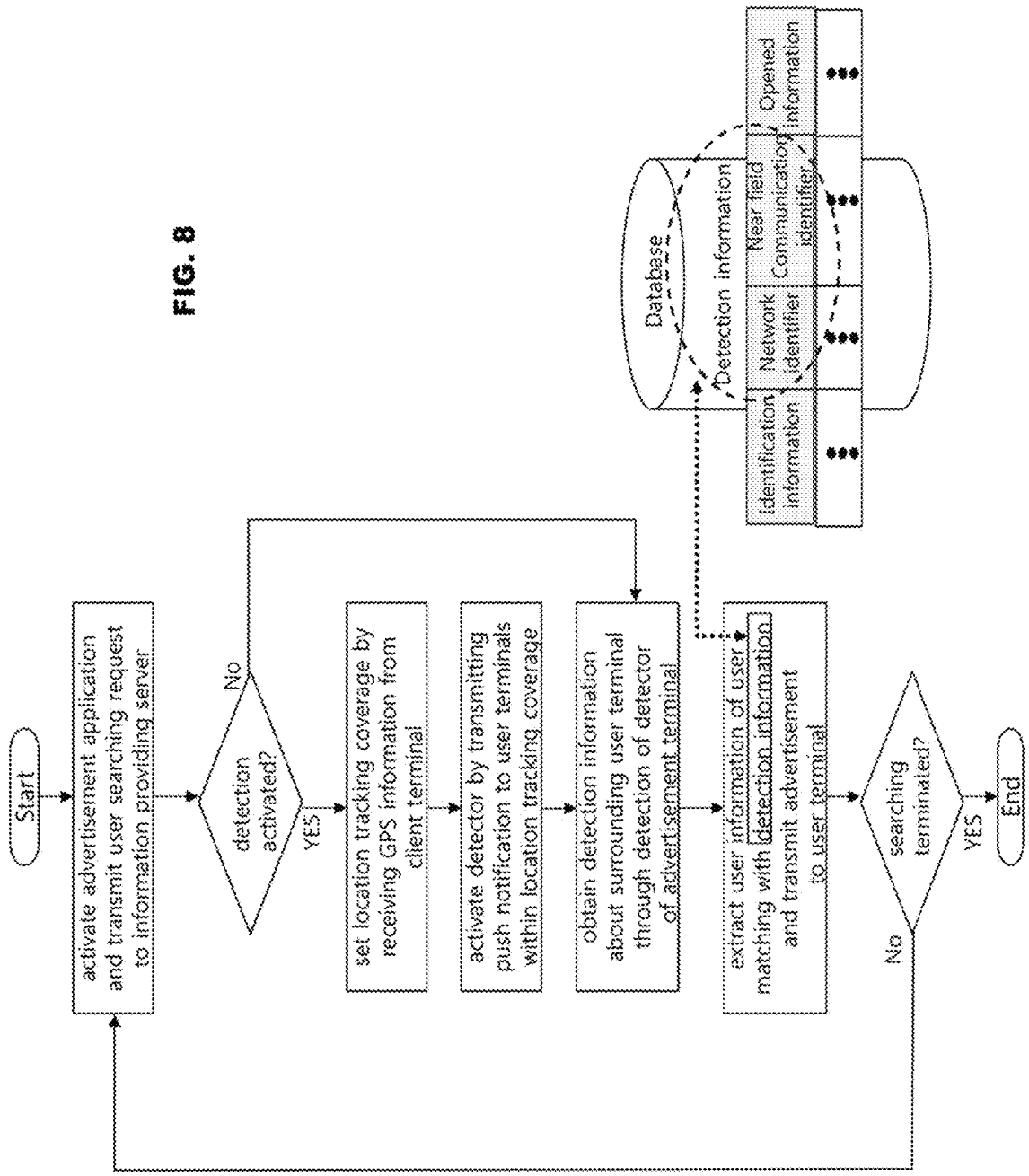

SHORT DISTANCE USER RECOGNITION SYSTEM, AND METHOD FOR PROVIDING INFORMATION USING SAME

CROSS REFERENCE TO PRIOR APPLICATIONS

This application is a National Stage Application of PCT International Patent Application No. PCT/KR2014/002708 filed Mar. 31, 2014, under 35 U.S.C. § 371, which claims priority to Korean Patent Application Nos. 10-2013-0036044 filed Apr. 2, 2013, 10-2013-0048867 filed Apr. 30, 2013, and 10-2013-0063566 filed Jun. 3, 2013, which are all hereby incorporated by reference in their entirety.

BACKGROUND OF THE INVENTION (a) Field of the Invention

The present invention relates to a system for identifying a user at a close range and an information providing system and method using the same, and more particularly to a close-range user identification system and an information providing system and method using the same, in which at least one user located at a close range visible to a client's naked eyes is searched and identified through a network or close-range communication directing, and opened information of the at least one identified user or a location-based advertisement is given to the at least one searched user.

(b) Description of the Related Art

In an Internet or mobile Internet service including a social networking service (SNS) that a user basically has to subscribe, a conventional location-tracking type, i.e. location-based social networking system (SNS) and social dating system provides user information in units of km because of an error range of a global positioning system (GPS) and a limit of a location search technology, and it is therefore impossible to receive opened information from or provide advertisement to a specific user located at a close range, i.e. within range of vision since too many users are searched when the location-tracking type is applied.

That is, the location tracking system based on the GPS finds a user's location within an error range of a mounted GPS chipset. The error range is 300 m in case of a low-price system, and 60 m in case of a general cellular phone. Thus, the error range is too wide to receive and provide information about a user located within 10~20 m visible to naked eyes.

In addition, the current location tracking technology, in which locations of users are compared in a server based on the GPS, provides not only information within the error range excessively broadened with respect to time and space, i.e. information about too many persons and information containing location errors but also information items of persons previously recorded in the server before updating the location storage server when a user wants to receive information items of a person within his/her reach. For example, If a user is walking in a street and location tracking cycle and update cycle of the user data in server does not match, the user already moved to another location.

In this case, it is impossible to update the server in real time in order to accept many users due to problems of power consumption of the GPS, real-time traffic between a server and the users, real-time change, update lead time of a database. Further, since not the current or real-time records but the past records are compared with one another, user engagement is not useful. In addition, the current GPS chipset mounted to a smart phone has an error range of 300 m or wider in light of its performance if wireless fidelity (Wi-Fi) for correcting a location is not on, and it is therefore impossible to provide user engagement within the same space at the same time where humans can recognize each other with naked eyes.

For instance, too many users are searched when a user wants to receive another user's opened information (a contact number, E-mail, social network identification, or the like agreed to be published) to satisfy his/her curiosity about people with special preferences in a specific place such as a museum, a bookstore, a gallery, etc. where scores to hundreds of people are searched within 1 km. Consequently, it is impossible to specify an interesting subject within a user's reach and receive the opened information from the specified subject, and thus there is a limit to practically achieve the concept of the user engagement that takes count of the real-time and the close range.

SUMMARY OF THE INVENTION

Accordingly, the present invention is conceived to solve the foregoing problems, and an aspect of the present invention is to provide a system and method for providing information based on close-range user, which can specify a user at a close range visible to naked eyes in real time, provide opened information about the specified user, and provide location-based advertisement, thereby offering powerful user engagement in a location-based social networking service.

Another aspect of the present invention is to provide a close-range user identification system, which employs not a "location"-based social networking service of continuously tracking a location of a user but a network means and a near field communication means for receiving opened information or advertisement based at close range user in order to detect a subject specific object in a detectable distance, i.e., the other party visible to naked eyes and determine understand a relationship by detecting only a "relative distance between users" within a network or close-range communication range, and an information providing system and method using the same.

In accordance with an embodiment of the present invention, there is provided a close-range user identification system including: a terminal which includes a detector to receive only detection information without communication or network connection through distance detection between the terminal and surrounding user-terminals, and an application to control the detector and provide an interface for receiving information; and an information providing server which receives detection information of a user located at a close range from the application, and extracts and identifies at least one surrounding user-terminal matching with the detection information.

The detector may include a network module for detecting a surrounding user terminal and other user terminals connected to a network through a network identifier, or a near field communication module for detecting at least one surrounding user terminal within near field communication coverage through a near field communication identifier, The network identifier may include a Wi-Fi MAC address, and the near field communication identifier may include a Bluetooth MAC address.

The terminal may include a client terminal having a social application which provides an interface for receiving a user searching request and opened information; the social application may provide an interface to transmit a user searching request to the information providing server, control detection of the detector, transmit the detection information to the information providing server, and receive opened information of at least one extracted user from the information providing server; and the information providing server may include a searching request manager which certifies a client to comply with a user searching request when the client makes the user searching request, a user information provider which extracts a matching user terminal by comparing stored user information with detection information of at least one surrounding user terminal detected by the detector of the client terminal in response to the user searching request, and provides opened information of a corresponding user to the client, and a database which stores and manages registered user information.

The user information provider may include a detection information receiving module which receives detection information from the client terminal; and a user information providing module which extracts a matching user by comparing the received detection information with user information stored in a database, and transmits the opened information of the user to the client terminal.

The terminal may include an advertisement terminal including an advertisement application which controls the detector and provides a user searching request; the advertisement application may transmit a user searching request to the information providing server, control detection of the detector, transmits detection information to the information providing server, and provide an interface to receive advertisement transmission information offered from the information providing server to at least one surrounding user terminal located at a close range; and the information providing server may include a searching request manager which certifies a client to comply with a user searching request when the user searching request is received from the advertisement terminal, a user information provider which extracts a matching user terminal by comparing detection information of at least one surrounding user terminal detected by the detector of the advertisement terminal with stored user information in response to the user searching request, an advertisement transmitter which transmits an advertisement registered by the advertisement terminal to the extracted user terminal, and a database which stores and manages registered user information and advertisement information registered by matched with the advertisement terminal.

The user information provider may include a detection information receiving module which receives the detection information from the advertisement terminal; and a user information extraction module which extracts a matching user by comparing the received detection information with user information stored in the database.

The user information may include user identification information, Wi-Fi MAC address information of a user terminal, Bluetooth MAC address information of a user terminal, a phone number of a user terminal, and opened information set by a user to be published.

The user information provider may further include a detection activating module which generates and outputs a push notification for activating network module or Bluetooth modules of user terminals located around the client terminal.

The detection activating module may collect GPS information of other user terminals located within location tracking coverage centering on the location of the client by receiving the GPS information from a location tracking module of the client terminal, and transmit the push notification for activating the network modules or the Bluetooth modules of the collected user terminals.

The detection activating module may receive GPS information from the location tracking module of the client terminal and transmit the push notification for activating the network modules or Bluetooth modules of the user terminal having a social application and located within location tracking coverage centering on the location of the client.

The push notification may include activating information for activating the network module or the Bluetooth module, and activating time information for starting the activation at a set time to synchronize the detection.

BRIEF DESCRIPTION OF THE DRAWINGS

The above and/or other aspects of the present invention will become apparent and more readily appreciated from the following description of the exemplary embodiments, taken in conjunction with the accompanying drawings, in which:

FIG. 8 is a flowchart of schematically showing a close-range user based advertisement providing method, in which advertisement is provided as information, according to an embodiment of the present invention.

DETAILED DESCRIPTION OF THE EMBODIMENTS

Figure 1:
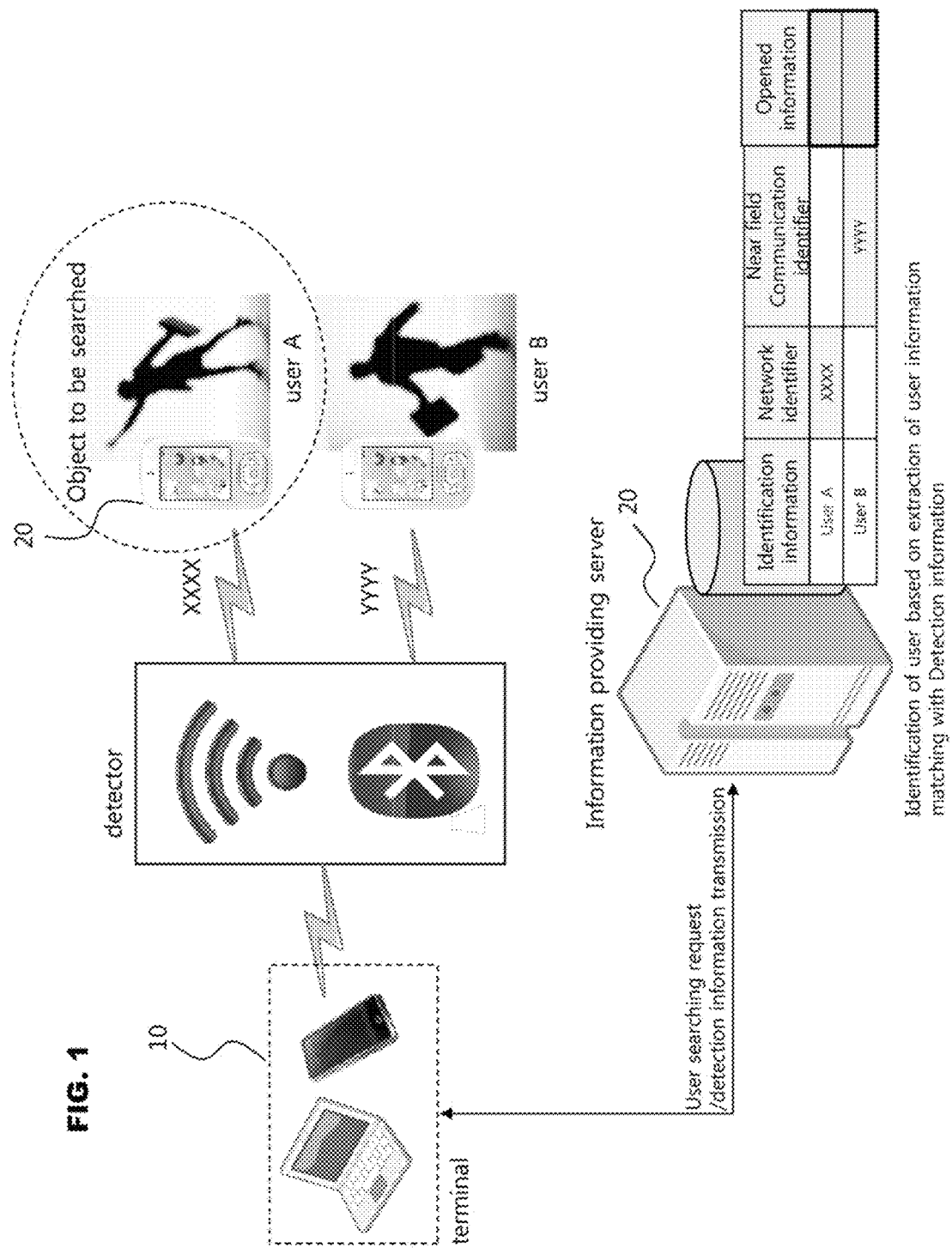
FIG. 1 schematically illustrates a close-range user identification system according to an embodiment of the present invention.

FIG. 1 schematically illustrates a close-range user identification system according to an embodiment of the present invention.

The close-range user identification system according to an embodiment of the present invention includes a detector which receives only detection information through detection of a distance between the terminal and surrounding user-terminals without communication or network connection; a terminal 10 which has an application to offer an interface for controlling the detector and receiving information; and an information providing server 20 which extracts and identifies a surrounding user terminal matching with the detection information from the detector in response to an application's request for searching a user located at a close range.

The terminal 10 may be a personal portable terminal, or a stationary terminal such as a personal computer (PC), a point of sale (POS), etc. installed at a certain place.

The detector 110 transmits and receives data by wirelessly accessing Internet, and includes a network module for detecting a surrounding user terminal through a network identifier or a near field communication module for detecting a surrounding user terminal through a near field communication identifier.

The network module is a module that uses Wi-Fi to access Internet and transmit and receive data, and stores a Wi-Fi media access control (MAC) address set as a network identifier, i.e. unique identification information for allowing the terminal to access the network.

In general, the network module serves to transmit and receive data by accessing Internet through Wi-Fi or track a location through Wi-Fi.

Wi-Fi is a wireless access point (AP) through which devices are connected within typically 200 m. Thus, one user terminal connected to the same Wi-Fi, within which another user terminals are located, is located at a close range to the one user terminal, and it is therefore possible to detect a user located at the close range by detecting the another user terminals connected to the same Wi-Fi.

Here, the detection is not tracking the location through Wi-Fi but detecting only the Wi-Fi MAC address, i.e. the unique identification information of the terminal connected to the Wi-Fi.

The Wi-Fi MAC address is the unique identification information of the terminal. In the case where the Wi-Fi MAC address is included in user information previously registered in a database of the information providing server, if the detected Wi-Fi MAC address is compared with the user information the server can extract matching user information (registered Wi-Fi MAC address) and transmit opened information corresponding to the user information to the client terminal.

In addition, the near field communication module is a module that performs communication with surrounding devices located at the close range, and each terminal may be achieved by a Bluetooth module having the unique identification information.

The Bluetooth module is a module that performs communication based on paring between devices located at a close range, and stores a Bluetooth MAC address set as unique identification information, i.e. Bluetooth identification information.

According to an embodiment of the present invention, the Bluetooth module does not perform pairing with a surrounding device but serves to detect only a Bluetooth Mac address of the surrounding devices.

Hereinafter, details of the detecting method will be described with reference to FIGS. 2 to 8.

By the way, the information providing server 20 according to an exemplary embodiment may include a user information provider which extracts and identifies matching user information by comparing the detection information of the surrounding user terminal detected from the detector of the terminal with the stored user information, and a database which stores and manages the registered user information.

The detection information is detectable only when the network module and the Bluetooth module are turned on. Therefore, it is impossible to detect the user terminal if the network module or Bluetooth module of the user terminal is turned off.

Accordingly, there is a need of activating the network module or Bluetooth module in order to search surrounding user, and the user information provider may further include a detection activating module which generates and outputs a push notification for activating the network modules or Bluetooth modules of the user terminals around the client terminal.

Below, exemplary embodiments of the present invention will be described in more detail with the accompanying drawings.

"Terminals" according to an embodiment of the present invention are defined as follows: a "client terminal" is defined as a terminal possessed by a detecting user who makes a request for detecting information about others located at a close range, an "advertisement terminal" is defined as a terminal that makes a request for retrieving information about others located at a close range in order to provide an advertisement, and a "user terminal is defined as a terminal possessed by a detected user who is located around the detecting user when there is a detecting request from the detecting user.

The "advertisement terminal" may be achieved by a kiosk terminal stationarily installed in a certain shop or region or a mobile terminal carried by a manager of the certain shop.

Figure 2:
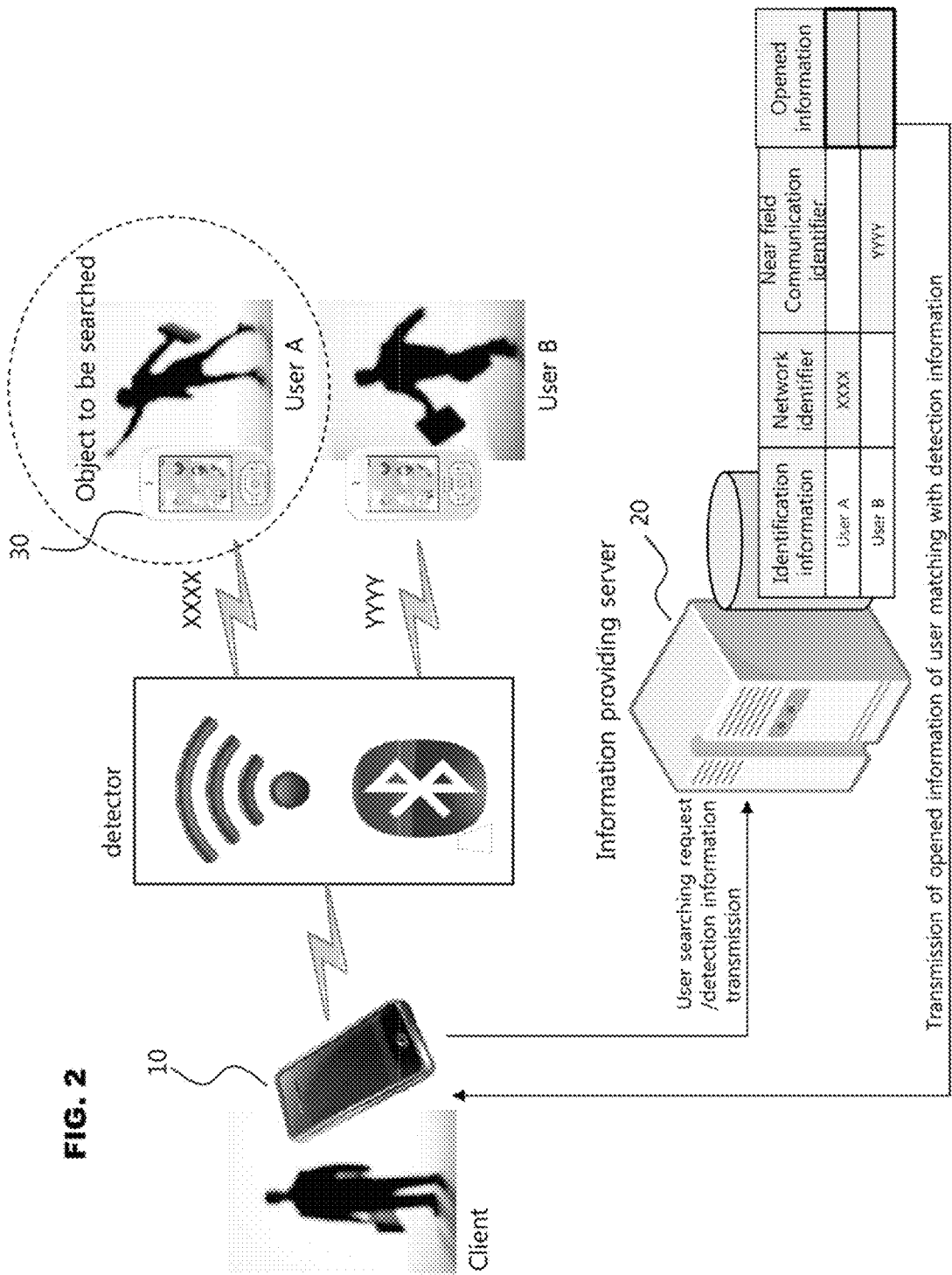
FIG. 2 schematically illustrates a close-range user information providing system using Bluetooth according to an embodiment of the present invention.
Figure 3:
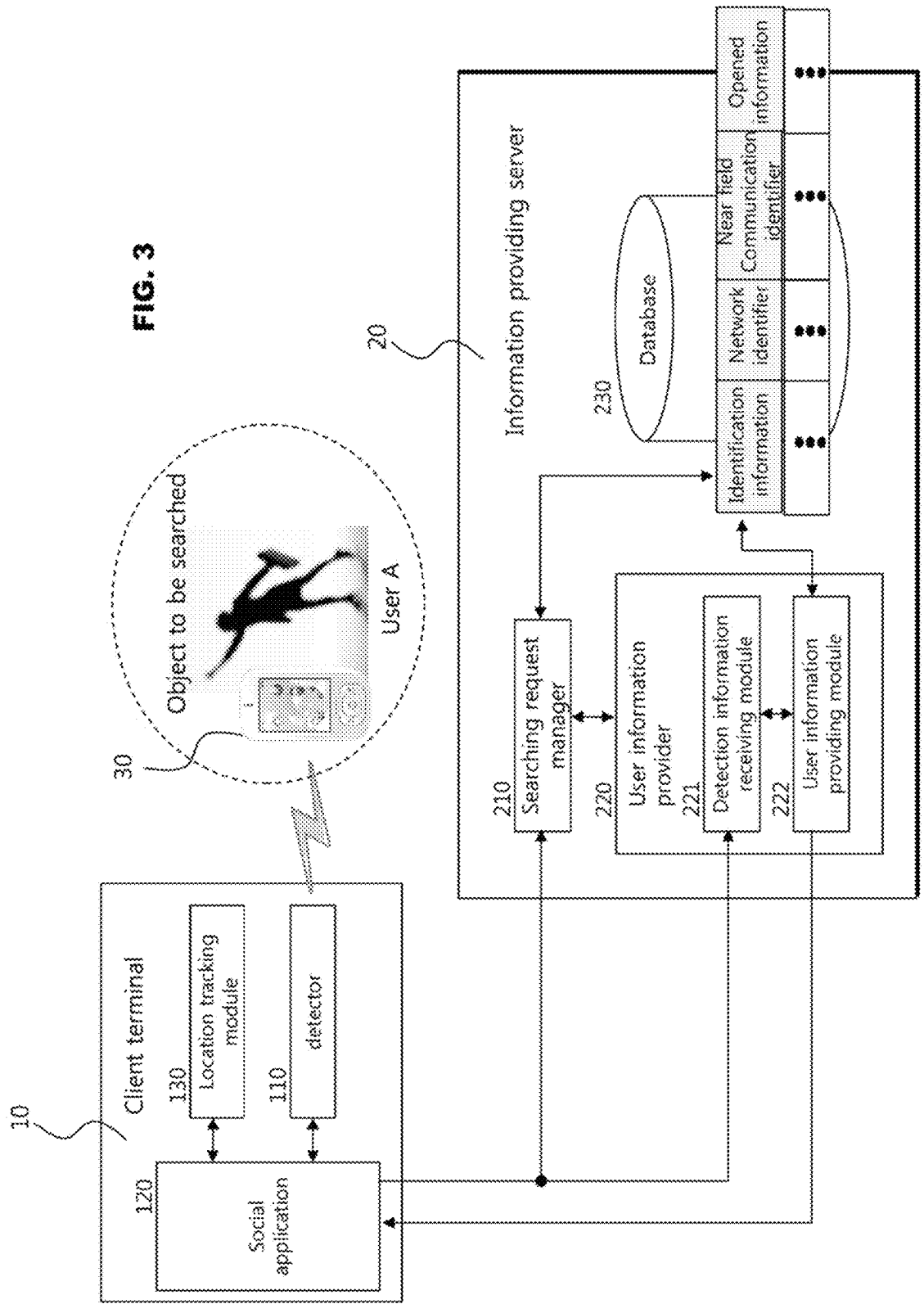
FIG. 3 is a block diagram of illustrating details of FIG. 2.

FIG. 2 schematically illustrates a close-range user information providing system using Bluetooth according to an embodiment of the present invention, and FIG. 3 is a block diagram of illustrating details of FIG. 2.

Referring to FIGS. 2 and 3, the close-range user information providing system according to the present invention includes a client terminal 10 which includes a detector 110 for detecting surrounding user terminals, and a social application 120 controlling the detector 10 and offering an interface to make a request for searching a user and receive opened information; and an information providing server which receives the request for searching a user located at a close range from the client terminal and providing the opened information of the detected surrounding user terminal to the client terminal.

The detector 110 wirelessly accesses Internet to transmit and receive data, and includes a network module for detecting at least one surrounding user terminal through a network identifier or a near field communication module for detecting at least one surrounding user terminal through a near field communication identifier.

The network module is a module that uses Wi-Fi to access Internet and transmit and receive data, and stores a Wi-Fi MAC address set as the network identifier, i.e. unique identification information for connecting with the network of the terminal.

In general, the network module serves to access Internet and transmit and receive data through Wi-Fi, or track a location through Wi-Fi.

However, the network module according to an embodiment of the present invention does not serve to transmit and receive data and track the location, but serves to detect the Wi-Fi MAC address of a user terminal located around and connected to Wi-Fi.

Wi-Fi is a wireless access point (AP) through which devices are connected within typically 200 m. Thus, a user terminal connected to the same Wi-Fi, within which a client terminal is located, is located at a close range to the client terminal, and it is therefore possible to detect a user located at the close range by detecting the user terminal connected to the same Wi-Fi.

Here, the detection is not tracking the location through Wi-Fi but detecting only the Wi-Fi MAC address, i.e. the unique identification information of the terminal connected to the Wi-Fi.

The Wi-Fi MAC address is the unique identification information of the terminal. In the case where the Wi-Fi MAC address is included in user information previously registered in a database of the information providing server, if the detected Wi-Fi MAC address is compared with the user information, the server can extract matching user information (registered Wi-Fi MAC address) and transmit opened information corresponding to the user information to the client terminal.

In addition, the near field communication module is a module that performs communication with surrounding devices located at the close range, and each terminal may be achieved by a Bluetooth module having the unique identification information.

The Bluetooth module is a module that performs communication based on paring between devices located at a close range, and stores a Bluetooth MAC address set as unique identification information, i.e. Bluetooth identification information.

In general, the Bluetooth module serves to perform communication with a surrounding device located at a close range, based on paring.

Bluetooth is a standard near field communication method by which communication between a portable device and a surrounding device or between other terminals is enabled through pairing, and is not suitable for tracking the location.

Bluetooth is mostly applied to a device using a battery, and thus activates networking at a certain time, i.e., performs networking by pairing in order to reduce power consumption of the battery and tighten security at a close range.

However, the Bluetooth module according to an embodiment of the present invention does not perform pairing with a surrounding device, but detects only the Bluetooth MAC address of the surrounding device.

Regarding the pairing, it is impossible to check information about a user located at a close range through a pairing mode since the pairing is disabled if a detected user gives no approval to Bluetooth. However, according to the present invention, only the MAC address of the user terminal possessed by a user located within Bluetooth coverage is detected, and it is therefore possible to detect only the Bluetooth MAC address in a device searching mode regardless of getting the approval from a detected user.

The Bluetooth MAC address is the unique identification information of the terminal. In the case where the Bluetooth MAC address is included in user information previously registered in the database of the information providing server, if the detected Bluetooth MAC address is compared with the user information, the server can extract matching user information (registered Bluetooth MAC address) and transmit opened information corresponding to the user information to the client terminal.

In addition, the client terminal according to the present invention may further include a location tracking module 130 for secondarily extracting a surrounding user located at a range close to the client through the detector after primarily limiting a user terminal within a location tracking range.

The location tracking module 130 may be achieved by a global positioning system (GPS) for tracking the location based on satellite signals, or by a Wi-Fi based wireless local area network (LAN) possible to the extent of indoor locating tracking.

The location tracking module 130 may be used for not tracking a location of a certain user, but primarily limiting a subject located within communication coverage based on the location of the client when the client makes a request for searching a user.

The social application 120 transmits the client's request for searching a user to the information providing server, obtains detection information of a surrounding user terminal by detecting a surrounding user terminal within detection coverage through the detector 110 if the information providing server makes a request for the detection information and transmit the detection information to the information providing server, and provides a service interface on which a user's opened information received from the information providing server is displayed.

According to an embodiment of the present invention, the information providing server 20 may include a searching request manager 210 which certifies a client to comply with a user searching request from a certified client if the client makes a request for searching a user; a user information provider 220 which compares the stored user information with detection information of a surrounding user terminal detected by the detector of the client terminal in response to the user searching request, extracts a matching user terminal, and provides the opened information of the matching user to the client; and a database 230 which stores and manages the registered user information.

The searching request manager 210 provides the social application for the user searching request to the client terminal, certifies whether the client terminal is a registered member when the client terminal makes a user searching request, and then complies with the user searching request. If the client terminal is not the registered member, the searching request manager 210 provides an interface for guide to sign up for a membership. The user information provider 220 may include a detection information receiving module 221 which receives the detection information from the client terminal; and a user information providing module 222 which compares the received detection information with the user information stored in the database, extracts information about a matching user, and transmits the extracted information to the client terminal.

The detection information may be the network identifier or the near field communication identifier as the unique identification information of the user terminal received from the client terminal.

The network identifier may be the Wi-Fi MAC address which is managed by the network module of the user terminal, and the near field communication identifier may be the Bluetooth MAC address which is managed by the Bluetooth module.

The database 230 of the information providing server stores and manages the registered user information, and the user information may include member identification information, the Wi-Fi MAC address, the Bluetooth MAC address and the opened information.

Thus, when the Wi-Fi MAC address or the Bluetooth MAC address is received as the detection information, the user information providing module 222 compares the detection information and the user information stored in the database, specifies a matching user, extracts the opened information of the specified user, and provides the opened information to the social application 120 of the client terminal.

Here, the opened information may include information opened by a user, such as a name, an age, a job/graduated from, a picture, a profile, an address, a hobby, an interesting keyword, a phone number, E-mail address, SNS ID, etc.

Since an object of the present invention is to provide opened information of a user located at a close range visible to naked eyes and it is possible for the client to specify a user desired to be searched among a plurality of users based on their pictures if there are many users within the close range, the user information may include information about a picture.

Further, the detection information is detectable only when the network module and the Bluetooth module are turned on.

Therefore, if the network module or Bluetooth module of the user terminal is turned off, it is impossible to detect the user terminal.

Accordingly, there is a need of activating the network module or the Bluetooth module in order to search a surrounding user, and thus the information provider may further include a detection activating module 223 which generates and outputs a push notification for activating the network modules or Bluetooth modules of the user terminals located around the client terminal.

Figure 4:
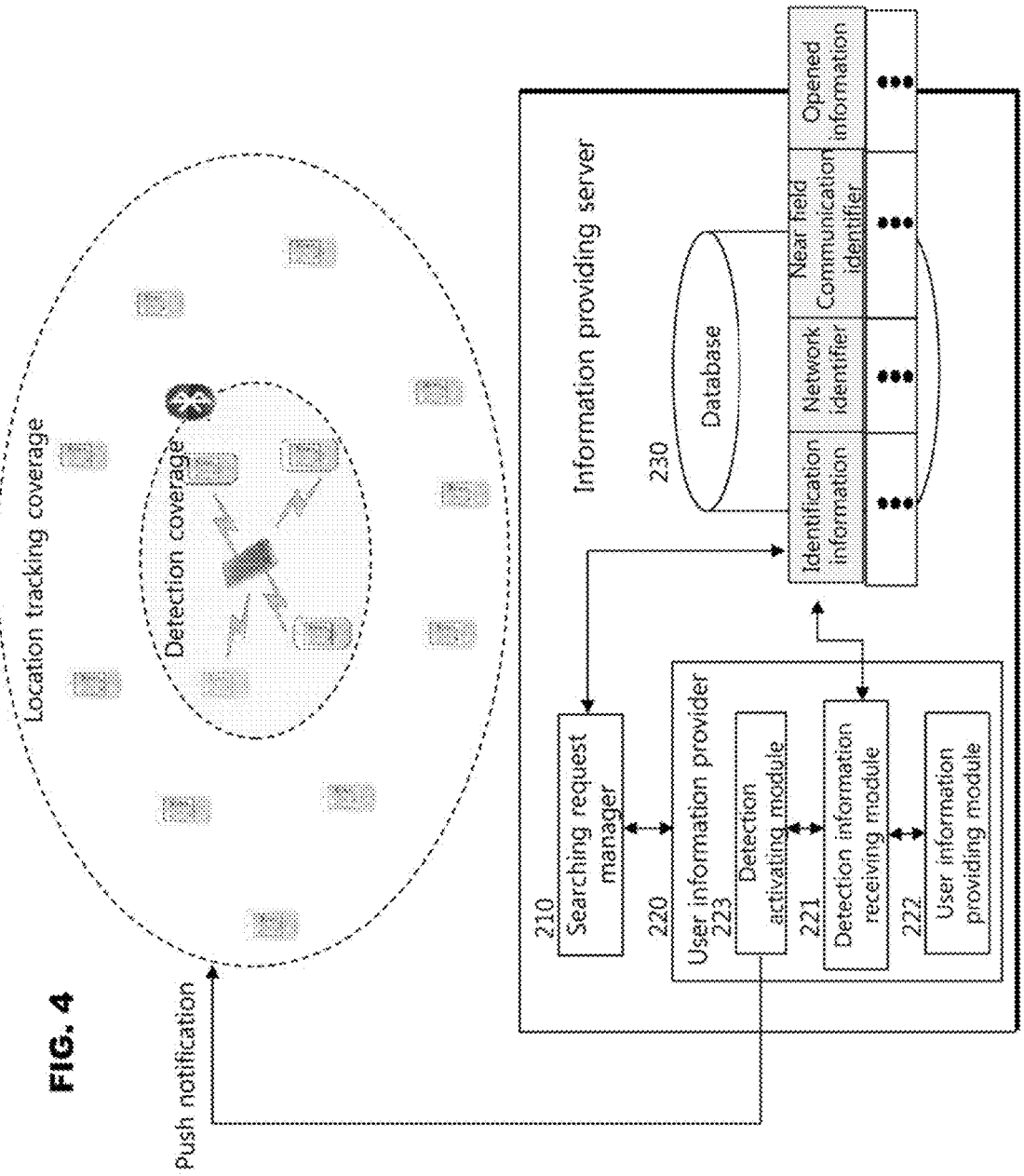
FIG. 4 schematically illustrates that a detection activating module transmits a push notification according to an embodiment of the present invention.

FIG. 4 schematically illustrates that the detection activating module transmits the push notification according to an embodiment of the present invention.

The detection activating module 223 receives GPS information from the location tracking module 130 of the client terminal 10, and transmits the push notification to user terminals, of which the network module or the Bluetooth module is turned off, among user terminals located within the locating tracking coverage centering around the location of the client, thereby promoting the activation of the network module or Bluetooth module.

Below, the close range user information providing method according to an embodiment of the present invention will be described.

Figure 5:
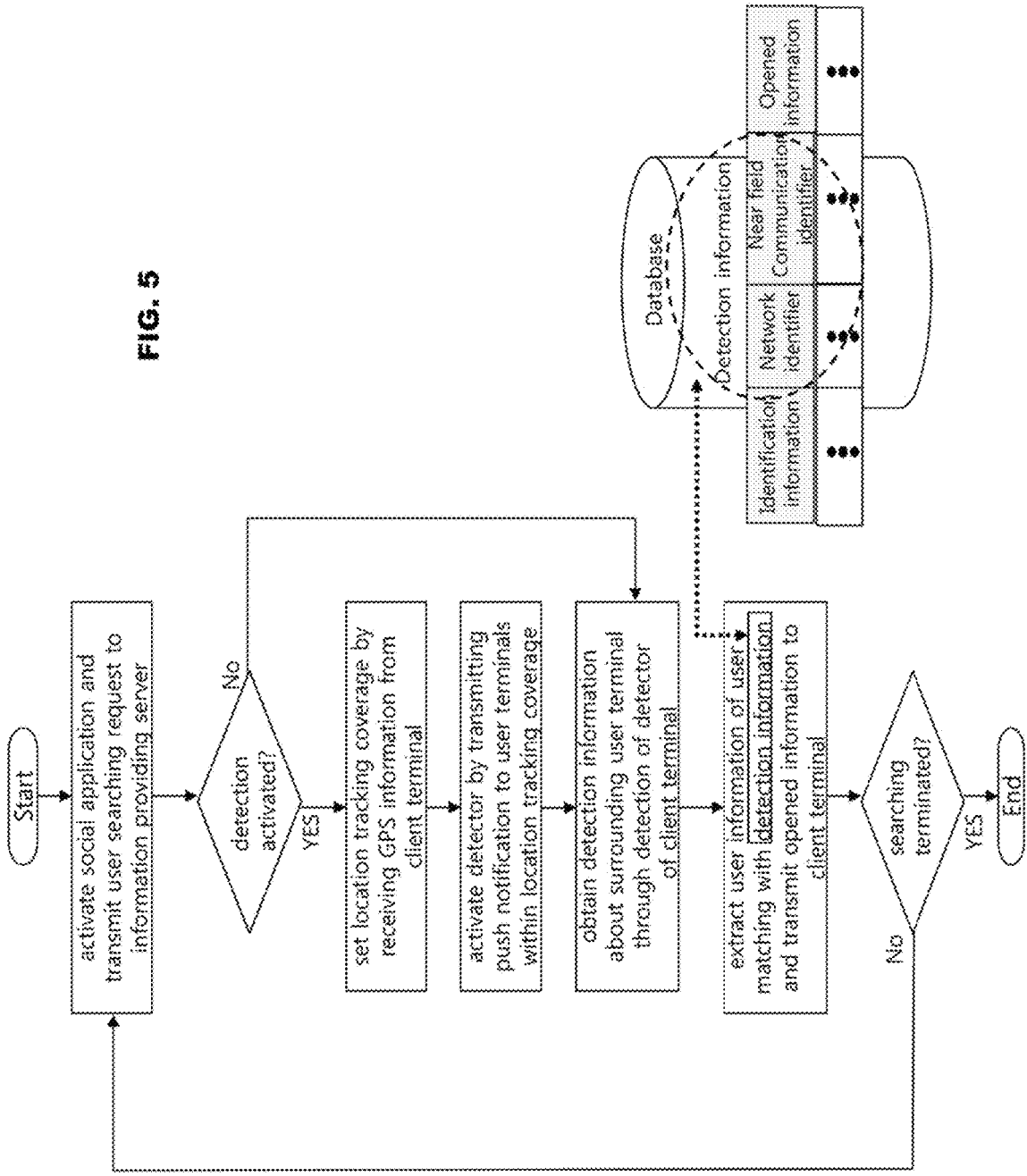
FIG. 5 is a flowchart of schematically showing a close-range user based information providing method according to an embodiment of the present invention.

FIG. 5 is a flowchart of schematically showing a close-range user based information providing method according to an embodiment of the present invention.

Referring to FIG. 5, a client executes a social application installed in a client terminal and transmits a user searching request to the information providing server.

Here, the client transmits the user searching request to the information providing server in order to receive opened information of the other party located at a close range visible to naked eyes.

In response to the user searching request, the information providing server certifies the client and then complies with the user searching request.

In more detail, the searching request manager of the information providing server receives the user searching request, certifies whether the client is the registered member, complies with the user searching request if the client is successfully certified, and issues a command to transmit the detection information to the social application.

In response to the command for transmitting the detection information, the social application obtains the detection information of other surrounding user terminals through the detector, i.e. the network module or the Bluetooth module.

If the detection is performed by the network module, the social application receives the Wi-Fi MAC address information of other user terminals located within Wi-Fi coverage as the detection information by the detection of the network module.

If a plurality of pieces of Wi-Fi MAC address information are received from other user terminals, the social application generates a list of Wi-Fi MAC address information and then obtains the detection information.

Wi-Fi has unique identification information, and while the network module is being turned on, it is possible to receive Wi-Fi MAC address information of the terminals using Wi-Fi for communication.

In addition, if the detection is performed by the Bluetooth module, the social application receives the Bluetooth MAC address information by detecting other user terminals located within Bluetooth coverage through the Bluetooth module.

If a plurality of pieces of Bluetooth MAC address information are received from other user terminals, the social application generates a list of Bluetooth MAC address information and then obtains the detection information.

If the other party gives no approval to Bluetooth, connection under the pairing mode is impossible. However, it is possible to detect the Bluetooth MAC address information while the Bluetooth module is turned on, i.e., under a Bluetooth device searching mode.

Here, Wi-Fi coverage is less than 200 m but larger than Bluetooth coverage of 10~100 m, and thus too many users may be searched like the location tracking based on the GPS. Accordingly, a Bluetooth mode is recommended rather than a network mode in order to accurately search a nearby user.

On the other hand, it is impossible to perform the detection while the network module or the Bluetooth module is turned off. In other words, it is impossible to detect a user terminal desired to be searched by the client if the network module or Bluetooth module of the user terminal is turned off. Accordingly, if the network module or Bluetooth module of the user terminal located around the client is activated, the accuracy of the detection is improved.

Accordingly, when the client terminal makes a user searching request, the detection activating module generates and outputs the push notification for activating the network modules or Bluetooth modules of other user terminals located around the client terminal before the client terminal tries to perform the detection.

The detection activating module may receive GPS information (e.g., geo tag information) from the location tracking module of the client terminal, collect the GPS information of other user terminals located within the location tracking coverage centering upon the location of the client, and transmits the push notification for activating the network module or Bluetooth module to other user terminals.

Even though the network module or the Bluetooth module is turned off, the location tracking module is turned on as long as the terminal is powered on. Thus, it is possible to collect the GPS information of the user terminals located around the client within the location tracking coverage through the GPS information of the terminal.

Further, the detection activating module may output the push notification through the social application. Opened information of a user may be provided in response to the client's user searching request only when the user is a member registered to the information providing server, and the registered member has the social application in his/her terminal. Thus, the push notification is transmitted to only the terminal having the social application, i.e., only the user terminal of the registered member.

The detection activating module transmits the push notification for activating the network module or the Bluetooth module to only the user terminal, in which the social application is installed, among the user terminals located within the location tracking coverage centering upon the location of the client, and the social application receives the push notification to activate the network module or the Bluetooth module.

The push notification may include activating information to activate the network module or the Bluetooth module, and activating time information to start the activation at a set time for synchronizing the detection.

For example, the push notification may involve time information in order to activate the network module or the Bluetooth module for 5~10 seconds after lapse of 5 seconds from receiving the push notification. In accordance with the time information, the network module or the Bluetooth module may be activated.

As described above, if the push notification is output, the push notification is transmitted to even the client terminal. Therefore, it is possible to perform the detection in sync with the time information of the push notification and obtain the detection information of other user terminals located around the client terminal.

When the detection information is obtained, the social application of the client terminal transmits the detection information to the information providing server.

The user information provider of the information providing server receives the detection information, and extracts a list of matching user information by comparing the network identifier or Bluetooth identifier information corresponding to the detection information with the user information stored in the database.

If the list of user information is extracted, a list of opened information contained in the user information is made and then transmitted to the social application of the client terminal.

Figure 6:
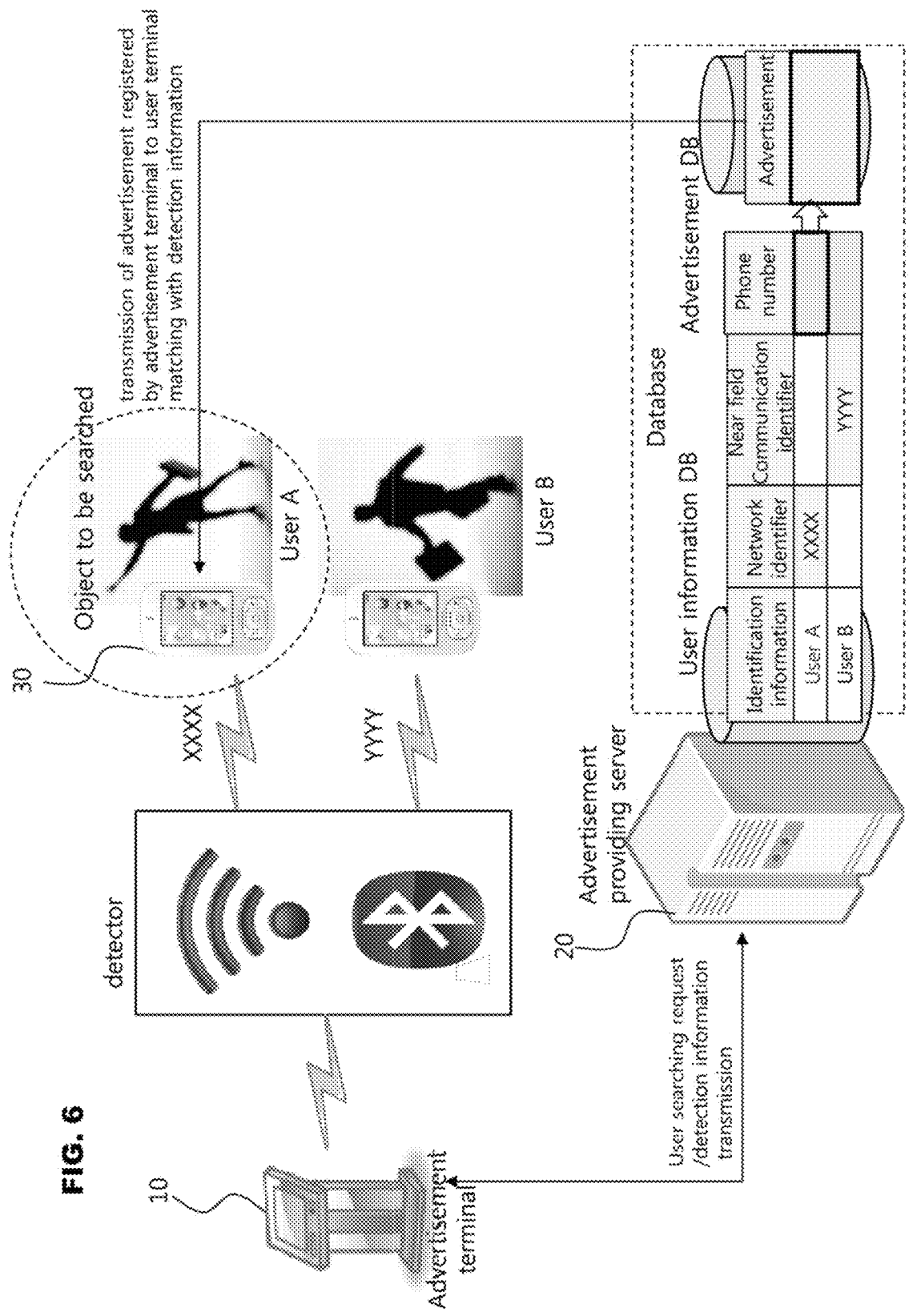
FIG. 6 schematically illustrates a close-range user based information providing system using Bluetooth according to another embodiment of the present invention.
Figure 7:
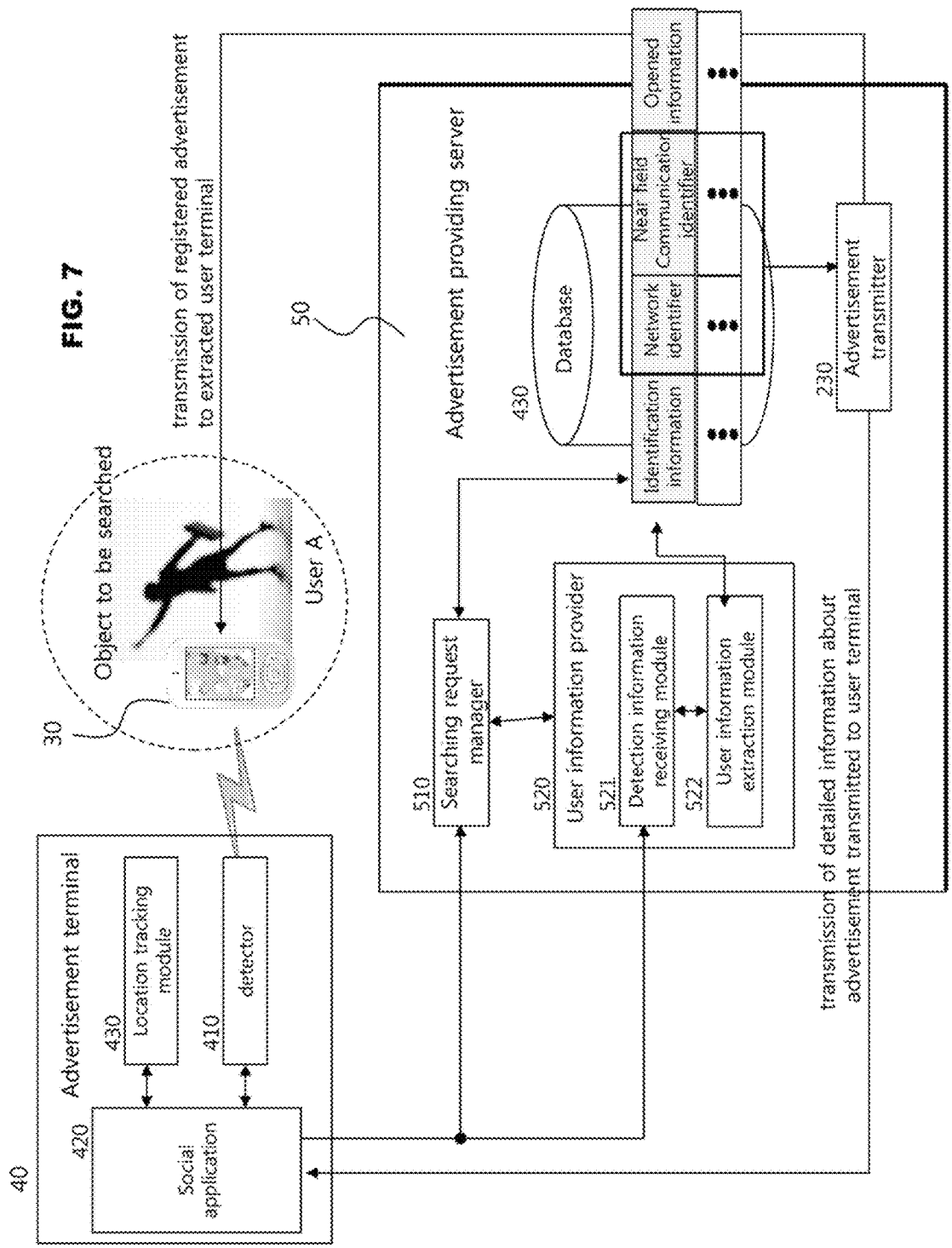
FIG. 7 is a block diagram of illustrating details of FIG. 6.

FIG. 6 schematically illustrates a close-range user based information providing system using Bluetooth according to another embodiment of the present invention, and FIG. 7 is a block diagram of illustrating details of FIG. 6.

Referring to FIGS. 6 and 7, the close-range user based information providing system according to this embodiment of the present invention is related to a system for specifying a user visible to naked eyes and providing an advertisement as information to the specified user.

In more detail, the close-range user based information providing system according to this embodiment of the present invention includes an advertisement terminal 40 which includes a detector 410 for detecting a surrounding user terminal, and an advertisement application 420 controlling the detector 410 and offering an interface to make a request for searching a user and provide an advertisement to the detected user; and an information providing server 50 which receives the request for searching a user located at a close range from the advertisement terminal and providing an advertisement to a registered member among the detected surrounding user terminals from the advertisement terminal.

Details of the detector 410 are the same as the detector 110 shown in FIGS. 3 and 4, and thus repetitive descriptions thereof will be avoided.

The Bluetooth MAC address is the unique identification information of the terminal. In the case where the Bluetooth MAC address is included in user information previously registered in the database of the information providing server, if the detected Bluetooth MAC address is compared with the user information, the server can extract matching user information (registered Bluetooth MAC address) and transmit an advertisement registered by the advertisement terminal to a matching member.

The advertisement is registered by a manager of the advertisement terminal making a searching request, and may include any information generated for giving information related to a shop, a region or a place. In particular, the information related to the shop may include information about a location, use guide, business hours and discount information of the shop.

Further, the advertisement may contain a coupon for offering an event such as a discount or a giveaway. The coupon may be given together with the advertisement while transmitting the advertisement.

As described above, the advertisement terminal can specify a user terminal located at a close range and provide a registered advertisement, and it is thus possible to provide a substantial location-based advertisement. Further, the user terminal located at the range close to the advertisement terminal means that the user terminal has passed the close range in which the advertisement terminal is installed, and therefore the manager of the advertisement terminal can have a significant effect on providing the advertisement by targeting a substantial user.

According to the present invention, the advertisement terminal may further include a location tracking module 430 for secondarily extracting a surrounding user located at a range close to the client through the detector after primarily limiting a user terminal within a location tracking range. The location tracking module 430 is the same as the location tracking module 130 shown in FIGS. 3 and 4, and thus repetitive descriptions thereof will be avoided.

The location tracking module 430 may be used for not tracking a location of a certain user, but primarily limiting a subject located within communication coverage based on the location of the advertisement terminal when the advertisement terminal makes a request for searching a user.

The advertisement application 420 obtains detection information of at least one surrounding user terminal by detecting surrounding user-terminals within detection coverage through the detector 410 if the information providing server 50 makes a request for the detection information, and transmits the detection information to the information providing server 50.

According to an embodiment of the present invention, the information providing server 50 may include a searching request manager 510 which certifies the advertisement terminal 40 to comply with a user searching request from the certified advertisement terminal 40 if the advertisement terminal 40 makes a request for searching a user; a user information provider 520 which compares the stored user information with detection information of a surrounding user terminal detected by the detector of the advertisement terminal in response to the user searching request, and extracts a matching user terminal; an advertisement transmitter 530 which provides the advertisement to the extracted user terminal; and a database 540 which stores and manages the registered user information and the advertisement information.

The searching request manager 510 provides the advertisement application for the user searching request to the advertisement terminal, certifies whether an advertisement terminal is a registered member when the advertisement terminal makes a user searching request, and then complies with the user searching request.

The user information provider 520 may include a detection information receiving module 521 which receives the detection information from the advertisement terminal; and a user information extraction module 522 which compares the received detection information with the user information stored in the database and extracts information about at least one matching user.

Here, the detection information may be the network identifier or the near field communication identifier as the unique identification information of the user terminal received from the advertisement terminal.

The network identifier may be the Wi-Fi MAC address which is managed by the network module of the user terminal, and the near field communication identifier may be the Bluetooth MAC address which is managed by the Bluetooth module.

The database 540 of the information providing server stores and manages the registered user information, and the user information may include member identification information, the Wi-Fi MAC address, the Bluetooth MAC address and the opened information.

Thus, when the Wi-Fi MAC address or the Bluetooth MAC address is received as the detection information, the user information extraction module 522 compares the detection information and the user information stored in the database, specifies a matching user, and extracts the identification information of the user terminal among the opened information of the specified user.

Here, the opened information may include information opened by a user, such as a name, an age, a job/graduated from, a picture, a profile, an address, a hobby, an interesting keyword, a phone number, E-mail address, SNS ID, etc. Further, the identification information of the user terminal may include a phone number of the user terminal.

Further, the detection information is detectable only when the network module and the Bluetooth module are turned on. Therefore, if the network module or Bluetooth module of the user terminal is turned off, it is impossible to detect the user terminal.

Accordingly, there is a need of activating the network module or the Bluetooth module in order to search a surrounding user, and thus the information provider may further include a detection activating module 523 which generates and outputs a push notification for activating the network modules or Bluetooth modules of the user terminals located around the advertisement terminal.

The operations of the detection activating module 523 for outputting the push notification are the same as those of the detection activating module 223 shown in FIG. 3 for outputting push notification, and thus repetitive descriptions thereof will be avoided.

Further, the advertisement transmitter 530 serves to transmit the advertisement registered by the manager of the advertisement terminal 40 to the user terminal extracted by the user information provider 520, and the advertisement may be stored in the database and managed while being mapped to every advertisement terminal.

Thus, the advertisement transmitter 530 transmits the previously registered advertisement to the user terminal extracted as a target subject by the advertisement terminal 40, thereby transmitting a substantially close-range location based advertisement to a user terminal.

Below, the close-range user based advertisement providing method according to an embodiment of the present invention will be described.

FIG. 8 is a flowchart of schematically showing a close-range user based advertisement providing method, in which advertisement is provided as information, according to an embodiment of the present invention.

Referring to FIG. 8, the advertisement application installed in the advertisement terminal is executed to transmit a user searching request to the information providing server.

Here, the advertisement application may periodically transmit the user searching request to the information providing server, or may transmit the user searching request directly input by the manager.

The information providing server certifies the advertisement terminal when receiving the user searching request, and complies with the user searching request.

In more detail, the searching request manager of the information providing server receives the user searching request, certifies whether the advertisement terminal is the registered terminal, complies with the user searching request if the advertisement terminal is successfully certified, and issues a command to transmit the detection information to the advertisement application.

In response to the command for transmitting the detection information, the advertisement application obtains the detection information of other surrounding user terminals through the detector, i.e. the network module or the Bluetooth module.

If the detection is performed by the network module, the advertisement application receives the Wi-Fi MAC address information of other user terminals located within Wi-Fi coverage as the detection information by the detection of the network module.

If a plurality of pieces of Wi-Fi MAC address information are received from other user terminals, the advertisement application generates a list of Wi-Fi MAC address information and then obtains the detection information.

Wi-Fi has unique identification information, and while the network module is being turned on, it is possible to receive Wi-Fi MAC address information of the terminals using Wi-Fi for communication.

In addition, if the detection is performed by the Bluetooth module, the advertisement application receives the Bluetooth MAC address information by detecting other user terminals located within Bluetooth coverage through the Bluetooth module.

If a plurality of pieces of Bluetooth MAC address information are received from other user terminals, the advertisement application generates a list of Bluetooth MAC address information and then obtains the detection information.

If the other party gives no approval to Bluetooth, connection under the pairing mode is impossible. However, it is possible to detect the Bluetooth MAC address information while the Bluetooth module is turned on, i.e., under a Bluetooth device searching mode.

Here, Wi-Fi coverage is less than 200 m but larger than Bluetooth coverage of 10~100 m, and thus too many users may be searched like the location tracking based on the GPS. Accordingly, a Bluetooth mode is recommended rather than a network mode in order to accurately search a nearby user.

On the other hand, it is impossible to perform the detection while the network module or the Bluetooth module is turned off. In other words, it is impossible to detect a user terminal desired to be searched by the advertisement if the network module or Bluetooth module of the user terminal is turned off. Accordingly, if the network module or Bluetooth module of the user terminal located around the advertisement is activated, the accuracy of the detection is improved.

Accordingly, when the advertisement terminal makes a user searching request, the detection activating module generates and outputs the push notification for activating the network modules or Bluetooth modules of other user terminals located around the advertisement terminal before the advertisement terminal tries to perform the detection.

The detection activating module may receive GPS information (e.g., geo tag information) from the location tracking module of the advertisement terminal, collect the GPS information of other user terminals located within the location tracking coverage centering upon the location of the advertisement, and transmits the push notification for activating the network module or Bluetooth module to other user terminals.

Even though the network module or the Bluetooth module is turned off, the location tracking module is turned on as long as the terminal is powered on. Thus, it is possible to collect the GPS information of the user terminals located around the advertisement within the location tracking coverage through the GPS information of the terminal.

Further, the detection activating module may output the push notification through the social application. As the push notification is transmitted in response to the user searching request of the advertisement terminal, the push notification is transmitted to only the user terminal of the registered member.

The detection activating module transmits the push notification for activating the network module or the Bluetooth module to only the user terminal of the registered member among the user terminals located within the location tracking coverage centering upon the location of the advertisement terminal, and the user terminal receives the push notification to activate the network module or the Bluetooth module.

The push notification may include activating information to activate the network module or the Bluetooth module, and activating time information to start the activation at a set time for synchronizing the detection.

For example, the push notification may involve time information in order to activate the network module or the Bluetooth module for 5~10 seconds after lapse of 5 seconds from receiving the push notification. In accordance with the time information, the network module or the Bluetooth module may be activated.

As described above, if the push notification is output, the push notification is transmitted to even the advertisement terminal. Therefore, it is possible to perform the detection in sync with the time information of the push notification and obtain the detection information of other user terminals located around the advertisement terminal.

When the detection information is obtained, the advertisement application of the advertisement terminal transmits the detection information to the information providing server.

The user information provider of the information providing server receives the detection information, and extracts a list of matching user information by comparing the network identifier or Bluetooth identifier information corresponding to the detection information with the user information stored in the database.

If the list of user information is extracted, a list of opened information contained in the user information is made and then the advertisement registered by the advertisement terminal is transmitted to the user terminals on the list. Further, detailed information about the advertisement transmitted to the list of user terminals is not only stored in the database but also transmitted to the advertisement terminal.

Therefore, the advertisement terminal can check which user receives the advertisement in real time, and directly obtain an advertising effect.

The present invention relates to a close-range user identification system and an information providing system and method using the same, and more particularly to a close-range user identification system and an information providing system and method using the same, in which a user located at a close range visible to a client's naked eyes is searched and identified through a network or close-range communication directing, and opened information of the detected user or a location-based advertisement is given to the detected user, thereby building a powerful social network and offering the close-range based advertisement. Thus, the present invention is very useful to a wireless network communication service.

According to an embodiment of the present invention, the error range is limited to 5~10 m or the same room to reduce the searching distance between users and improve accuracy of distance detection between users in a variety of SNS, and it is thus possible to receive basic opened information of the other party visible to naked eyes without conversation, thereby having a superior effect on providing powerful user engagement that has not been provided by a conventional SNS.

Further, on the contrary to a conventional location tracking method where locations of numerous users are continuously updated and tracked through a transaction between terminals and a sever, there is no need of determining relative locations between the users and it is possible to provide a service with a far less server source, so that user engagement can be given in real time, thereby having an excellent effect on not only offering accurate-searching and information-providing services but also building a system with low costs.

Although a few exemplary embodiments of the present invention have been shown and described, it will be appreciated by those skilled in the art that changes may be made in these embodiments without departing from the principles and spirit of the invention, the scope of which is defined in the appended claims and their equivalents.

What is claimed is:

1. A close-range based information providing system using the close-range user identification system comprising:
   a first terminal comprising a detector to receive detection information of one or more second terminals surrounding the first terminal through distance detection among the first terminal and the one or more second terminals without communication or network pairing connection, and an application to control the detector and to provide an interface to receive the detection information; and
   an information providing server including a processor and an algorithm communicated to the detector to receive a request of the detection information of the one or more second terminals located at a close range from the first terminal, and to extract and to identify at least one terminal from the one or more second terminals, the information providing server determining whether the extracted and identified terminal being matched with the requested detection information, wherein
   the detector comprises a network module to detect a near field communication identifier while a Bluetooth module is turned on under a Bluetooth device searching mode without the network pairing connection and to detect the at least one terminal within near field communication coverage through a near field communication identifier, and wherein
   the near field communication identifier comprises a Bluetooth MAC address, wherein
   the information providing server comprises a searching request manager to certify a terminal to comply with searching request in response to receipt of the user searching request from the first terminal;
   a user information provider configured to extract a matching user terminal by comparing stored user information with detection information of at least one surrounding user terminal detected by the detector of the first terminal in response to receipt of the searching request, and to identify a user terminal located at a close range; and
   a database which configured to store and to manage registered user information,
   wherein the user information provider further comprises a detection activating module configured to generate and to transmit a push notification for activating the network module or the Bluetooth module of user terminals located around the first terminal, and wherein each of the user terminals comprises a client terminal having a social application configured to provide an interface to receive a user searching request and opened information, the social application provides an interface to transmit the user searching request to the information providing server, to control detection of the detector, to transmit the detection information to the information providing server, and to receive opened information of at least one extracted and identified user information from the information providing server, and the information providing server comprises a searching request manager to certify a client to comply with a user searching request in response to receipt of the user searching request, and the user information provider configured to extract at least one matching user terminal by comparing stored user information with detection information of at least one surrounding terminal detected by the detector of the first terminal in response to receipt of the user searching request, and to provide opened information of a corresponding user for the user searching request, and a database to store and to manage registered user information.

2. The close-range user identification system according to claim 1, wherein the user information provider comprises:
a detection information receiving module to receive detection information from the first terminal; and
a user information providing module to extract a matching user by comparing the received detection information with user information stored in a database, and to transmit the opened information of the user to the first terminal.

3. The close-range user identification system according to claim 2, wherein the user information comprises at least one of user identification information, Wi-Fi MAC address information of a user terminal, Bluetooth MAC address information of a user terminal, a phone number of a user terminal, and opened information.

4. The close-range user identification system according to claim 2, wherein the user information provider further comprises a detection activating module to generate and to output a push notification for activating network module or Bluetooth modules of user terminals located around the client terminal.

5. The close-range user identification system according to claim 4, wherein the detection activating module to collect GPS information of other user terminals located within location tracking coverage centering on the location of the first terminal by receiving the GPS information from a location tracking module of the first terminal, and to transmit the push notification for activating the network modules or the Bluetooth modules of the collected terminals.

6. The close-range user identification system according to claim 5, wherein the push notification comprises activating information to activate the network module or the Bluetooth module, and to activate time information for starting the activation at a set time to synchronize the detection.

7. The close-range user identification system according to claim 4, wherein the detection activating module to receive GPS information from the location tracking module of the first terminal and to transmit the push notification for activating the network modules or Bluetooth modules of the first terminal having a social application and located within location tracking coverage centering on the location of a client.

8. The close-range user identification system according to claim 1, wherein
the first terminal comprises an advertisement terminal comprising an advertisement application to control the detector and to provide a user searching request;
the advertisement application to transmit the user searching request to the information providing server, to control detection of the detector, to transmit detection information to the information providing server, and to provide an interface to receive advertisement transmission information offered from the information providing server to at least one terminal located at a close range; and
the information providing server comprises a searching request manager to certify a client to comply with a user searching request in response to receipt of the user searching request from the advertisement terminal, a user information provider to extract a matching at least one terminal by comparing detection information of at least one surrounding terminal detected by the detector of the advertisement terminal with stored user information in response to receipt of the user searching request, an advertisement transmitter to transmit an advertisement registered by the advertisement terminal to the at least one extracted user terminal, and a database to store and to manage registered user information and advertisement information registered by matched with the advertisement terminal.

9. The close-range user identification system according to claim 8, wherein the user information provider comprises:
a detection information receiving module to receive the detection information from the advertisement terminal; and
a user information extraction module to extract a matching user by comparing the received detection information with user information stored in the database.

10. A close range user based information providing method using computer-implemented close-range user identification method comprising:
receiving detection information of one or more second terminals surrounding a first terminal through distance detection among the first terminal and the one or more second terminals without communication or network pairing connection and providing an interface to receive the detection information;
receiving a request of detection information of the one or more second terminals located at a close range from the first terminal, and extracting and identifying at least one terminal from the one or more second terminals for determining whether the extracted and identified terminal being matched with the requested detection information;
detecting a near field communication identifier module to detect a near field communication identifier while the Bluetooth module is turned on under a Bluetooth device searching mode without the network pairing connection and to detect the at least one terminal within near field communication coverage through the near field communication identifier, wherein the near field communication identifier comprises a Bluetooth MAC address;
receiving Wi-Fi MAC address information of at least one surrounding user terminal, connected to Wi-Fi and detected by a network module of the terminal, as the detection information, or
receiving Bluetooth MAC address information of at least one surrounding user terminal, located within Bluetooth coverage and detected by a near field communication module of the user terminal;

before transmitting the detection information, activating detection by activating a network module or a near field communication module of at least one surrounding the second terminal located around the first terminal;

receiving and complying with a user searching request from a user terminal;

receiving only detection information of a surrounding second terminal without communication or network connection, and transmitting the detection information to the information providing server; and extracting user information and determining whether the extracted user information being matched with the detection information.

11. The computer-implemented close-range user identification method according to claim 10, further comprising:

receiving a user searching request from an advertisement terminal;

receiving only detection information of at least one surrounding user terminal without communication or network connection, and transmitting the detection information to a information providing server; and extracting user information and determining whether the extracted user information being matched with the detection information, extracting and providing an advertisement to be provided to at least one user terminal.

12. The computer-implemented close-range user identification method according to claim 10, further comprising:

receiving Wi-Fi MAC address information of at least one surrounding user terminal, connected to Wi-Fi and detected by a network module of the client terminal or advertisement terminal, or receiving Bluetooth MAC address information of at least one surrounding user terminal, located within Bluetooth coverage and detected by a near field communication module of the client terminal or the advertisement terminal.

13. The computer-implemented close-range user identification method according to claim 12, further comprising:

before transmitting the detection information, activating detection by activating a network module or a near field communication module of a surrounding user terminal located around the client terminal or the advertisement terminal.

* * * * *